INVENTOR.
GORDON V. OEHSER
BY Frederic P. Smith
AGENT

United States Patent Office 3,312,821
Patented Apr. 4, 1967

3,312,821
PARTICLE MONITOR HAVING FIRST AND SECOND DETECTION MEANS CONNECTED BY AN ANTI-COINCIDENCE CIRCUIT
Gordon V. Oehser, Richmond, Calif., assignor to Laboratory for Electronics, Inc., Boston, Mass., a corporation of Delaware
Filed Oct. 11, 1963, Ser. No. 315,503
4 Claims. (Cl. 250—41.9)

This invention relates in general to particle detection system and in particular, to a new and improved particle monitor which responds selectively to charged particles according to certain of their characteristics.

During the past decade, numerous experiments have been conducted to determine the mass, energy, and directionality of radiation in space. This radiation may include alpha particles, beta particles, and the numerous other particles which are found, for example, in the solar wind. Particle monitors for use in such space exploration must satisfy many rigid requirements of which stability, accuracy, portability, and directionality are among the most important. The first two requirements are generally met by a variety of monitors, such as scintillation counters and particle spectrometers. These particle monitors require, however, heavy and bulky shielding to be made direction sensitive and as such they are ill suited for use in the payloads of space probes. While coincidence and anticoincidence techniques have been used in conjunction with scintillation counters to give a fairly good indication of the general direction of approach of incident particles, the efficacy of such techniques greatly diminishes when it is desired to record only those particles coming within a small solid angle. In addition, such modified scintillation counters, which rely upon anticoincidence techniques, cannot generally be used to give as accurate a measurement of mass and energy as can particle spectrometers which, however, have the disadvantages of being complex and bulky.

It is, therefore, the primary object of the present invention to provide a new and improved particle monitor.

It is another object of the invention to provide a particle monitor which is sensitive only to particles arriving from a preselected direction and which does not require heavy shielding.

It is a further object of the invention to provide a highly portable particle monitor which detects only charged particles having pre-selected characteristics.

It is still another object of the invention to provide a particle monitor which is especially useful for monitoring electrons in a flux of charged particles having various masses, energies and charges.

It is a further object of the present invention to provide a stable and accurate particle monitor in which a magnetic field focuses charged particles of chosen mass and energy onto a particle detector and a special type of scintillation counter acts as an anticoincident shield.

Generally speaking, in this invention a particle detector, such as a reverse-biased semi-conductor diode, is placed inside a hollow block of scintillating plastic which has an opening communicating with the interior thereof. The particle detector is so positioned with respect to the opening that a particle passing through the opening cannot impinge upon the particle detector without having to change its direction of motion. To this end, the particle is constrained to traverse a predetermined arcuate path and thereby avoid striking the scintillating plastic before impinging upon the particle detector. In one embodiment of the invention, a magnetic field is at right angles to the arcuate path and is used to constrain incident charged particles of selected mass and energy to traverse the arcuate path an strike the particle detector. Any other particles which impinge upon the particle detector must first strike the scintillating plastic which acts as an anticoincidence shield. That is to say, the output pulses from the particle detector which occur simultaneously with the output pulses from the scintillating plastic are rejected by a standard anticoincidence circuit which co-operates with the detector and the scintillating plastic.

These and other objects of the present invention, together with the further features and advantages thereof, will become more apparent from the following detailed description in which.

Figure 1A:
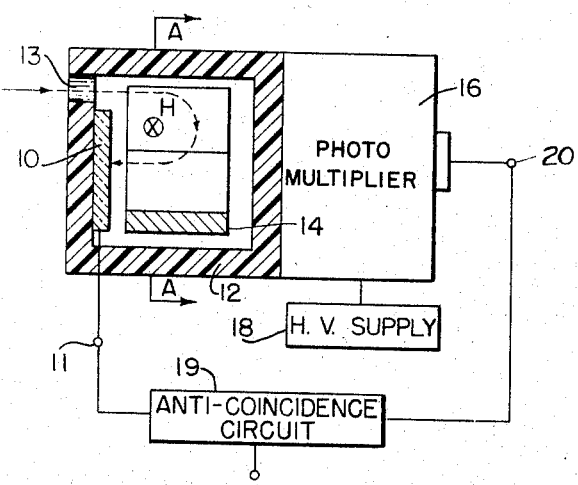
FIGS. 1a and 1b are cross-sectional views of a first embodiment of the invention using an internal magnet.

In FIG. 1a, a particle detector 10 is disposed on one of the walls defining a cavity in a block of scintillating plastic 12 which has an opening 13 therein to admit particles to the cavity. A permanent magnet 14, of which only the base section appears in this particular cross-sectional view, provides the magnetic field H which, as shown, is directed orthogonally to the plane of the paper. A charged particle entering through the opening 13 in the scintillating plastic block 12 is constrained to move in an arcuate path by the magnetic field H. The radius of curvature $r$, of such a particle can be described (in the non-relativistic case) by the following equation:

$$r = \frac{\sqrt{2mE}}{eH}$$

where $m$ is the mass of the particle, $E$ is the kinetic enrgy, $e$ is the electron charge, and $H$ is the magnetic field acting on the particle. From this equation, it is apparent that the radius of curvature for a constant magnetic field is dependent upon the product of the mass times the kinetic energy. To detect an incident charged particle having a particular mass-energy product, the magnetic field H is chosen so that only such a particle can strike the detector 10 without impinging upon the scintillating plastic block 12, that is, only such a particle will have the particular radius of curvature necessary to avoid the scintillating plastic block 12. In addition, the incident particle must have a direction of motion substantially normal to the face of the scintillating plastic block 12 containing the opening 13; and as such, the direction of motion of the incident particle is accurately known.

The specification of the mass-energy product is usually sufficient to identify a particular type of particle. This is especially true where the particle monitor is used to detect electrons; for a proton to have the same mass-energy product, its energy would have to be approximately $\frac{1}{2000}$ that of the electron. With such a small energy, the proton would not be able to excite the particle detector 10. In most cases of interest, moreover, it will not be necessary to distinguish between particles of different mass having the same mass-energy product. If it is necessary, however, electrostatic focusing, as is described in connection with FIG. 3, can be employed for distinguishing particles having the same mass-energy product but different kinetic energies.

When the particle strikes the particle detector 10, an output pulse is produced at terminal 11; if the particle has not struck the scintillating plastic block 12, this output pulse is recorded. If, however, the particle has contacted the scintillating plastic block 12, a nearly simultaneous light pulse accompanies the output pulse; this light pulse is detected by the photomultiplier 16 (shown with its associated high voltage supply 18) and, in response thereto, a corresponding voltage pulse is produced at terminal 20. A standard anti-coincident circuit 19 is connected to terminals 11 and 20. If an output pulse from terminal 11 is accompanied by a voltage pulse from terminal 20 within a preselected time interval, no pulse count is recorded since this would signify that a particle having an improper mass-energy product has struck both the particle detector 10 and the scintillating plastic block 12. It should be noted that many other phosphorescent substances can be substituted for the scintillating plastic block 12, such as films, liquids, and organic crystals and, hence, the particular substance and form of the anticoincidence shield is not limited to that described herein.

Figure 1B:
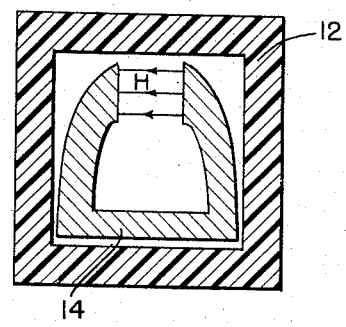

In FIG. 1b, a cross-sectional view of the particle monitor along the line AA in FIG. 1a is shown. The permanent magnet 14 is positioned inside the hollow plastic scintillating block 12 and generates the magnetic field H between its pole pieces. Because of the large area of the particle detector 10, as illustrated, the range of particles to be detected is rather broad. However, the particle detector area can, of course, be made very much smaller so that the range of particles detected is substantially decreased. In addition, the cavity in the plastic scintillating block 12 can be made smaller or otherwise configured so as to provide only a very confined arcuate path for the particle to traverse without contacting the plastic. In this way, the requirements of proper directionality and radius of curvature can be made much more stringent, and greater precision can be obtained with regard to particle identification and direction of motion.

Figure 2B:
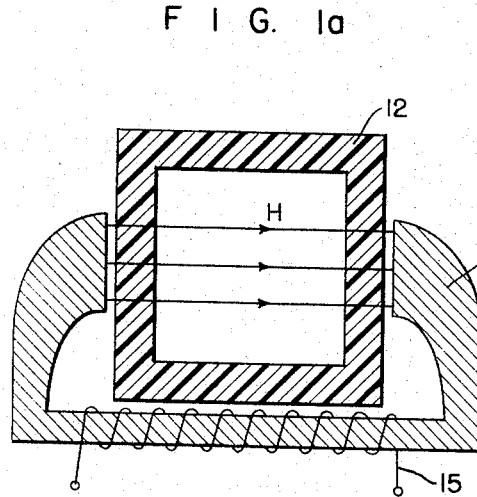
FIGS. 2a and 2b are cross-sectional views of a preferred embodiment of the invention.

The configuration shown in FIGS. 1a and 1b, that is, with the magnet 14 placed inside the scintillating plastic block 12, suffers from one disadvantage. Cosmic radiation, such as gamma rays, can go through the scintillating plastic block 12 without producing a voltage pulse. These gamma rays are then capable of producing secondary electrons in the magnet material which can, in some cases, strike the particle detector 10 without having first hit the scintillating plastic block 12. This disadvantage is obviated in the embodiment shown in FIGS. 2a and 2b, wherein the magnet 14 is external to the plastic scintillating block 12. The cross-sectional view in FIG. 2b is taken along the line BB in FIG. 2a. Any secondary electrons produced in the magnet 14 will have to pass through the plastic scintillating block 12 to reach the particle detector 10. These secondary electrons will thus cause voltage pulses to appear at terminal 20. Any voltage pulses appearing at terminal 11 because of such secondary electrons striking the particle detector 10 will be rejected by the anti-coincident circuit 19.

Figure 2A:
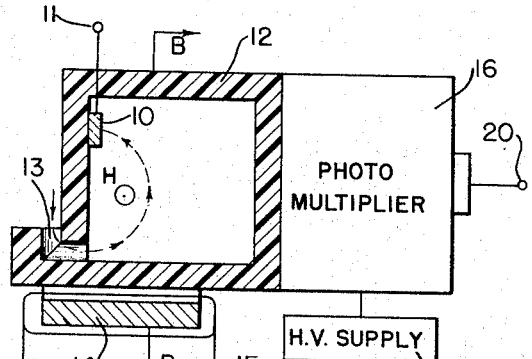

Several other modifications are also shown in FIGS. 2a and 2b. The magnet 14 is now energized by a coil 15 (connected to a standard power supply) which allows the magnetic field H to be varied over a range of values; in addition, the particle detector 10 has been considerably reduced in size to present a very small surface area to incoming particles. The particle monitor of FIGS. 2a and 2b is thus capable of detecting a range of particles having differing mass-energy products and accuracy is increased. Also, as the magnet 14 is now located externally to the scintillating plastic block 12, the opening 13 can be located such that the incident particle has to traverse a longer arcuate path than that shown in FIG. 1a. This may be done, as shown in FIG. 2a, by the addition of a projecting edge portion which is integral with one wall of the scintillating plastic block 12 and which overhangs a portion of the surface thereof. The opening 13 is seen to extend through this overhung surface portion whereby, in effect, a longer arcuate path is formed. Since the radius of curvature of the particle has to be more precise because of the longer path, a greater accuracy is realized in the measurement of the mass-energy product.

Figure 3:
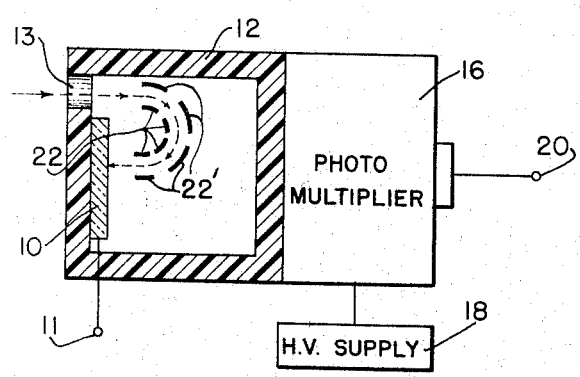
FIG. 3 is a cross-sectional view of an embodiment of the invention wherein an electric field is used.

In FIG. 3, an embodiment of the invention is shown utilizing electrostatic means instead of electromagnetic means to focus particles of the proper kinetic energy onto the particle detector 10. A series of straight and curved deflection plates 22 and 22′ are used to generate the electric fields which act upon the incident particles. The deflection plates 22 and 22′ may be individually energized from separate standard voltage sources (not shown) or the plates 22 (and the plates 22′) may be connected in parallel and energized from a single source. Since the mass of a particle does not enter into the equations for electrostatic focusing, the impinging particles are deflected in accordance with their kinetic energy alone, and by adjusting the voltages applied to the deflection plates, the particle monitor can be adapted to selectively detect particles having a particular energy within a range of energies.

As was previously indicated, the particle monitor is very sensitive to the direction of approach of incoming particles. Any particle, which does not enter the plastic block by way of a line of flight coextensive with the arcuate path, will strike the anti-coincidence shield before the particle detector and, hence, will not be recorded. It can also be shown from the physics of the particle-magnetic field interaction, that any particle which does not enter in a direction substantially orthogonal to the magnetic field H will be deflected either into or out of the plane of the drawing in FIG. 1a or 2a will strike the side surfaces of the plastic. This does not mean, however, that the magnetic field H must be orthogonal to the side of the particle monitor; variations from orthogonality are not critical if the particle detector 10 extends over a reasonable amount toward each side of the particle monitor. For the case of electrons, a field strength of 1 to 10 kilogauss, depending on the range of the electron energy, will be appropriate.

Having thus described the invention, it is apparent that numerous modifications and improvements may be made by those skilled in the art, all of which fall within the scope of the invention. Therefore, the invention herein disclosed should be construed to be limited only by the spirit and scope of the appended claims.

What is claimed is:

1. A particle monitor comprising: field generating means for constraining charged particles having preselected characteristics to traverse a predetermined arcuate path; first particle detection means to intercept incident charged particles including particles traversing said path, and to produce first signals in response to the intercepted particles; and second particle detection means comprising a medium surrounding said first particle detection means and having a hollow passage for particles traversing said predetermined path; said second particle detection means producing second signals in response to incident charged particles traversing paths other than said predetermined path for time comparison with said first signals and being traversed by charged particles incident thereon including particles to become incident upon said first particle detection means.

2. The apparatus of claim 1 wherein said medium comprises a block of scintillating plastic.

3. The apparatus of claim 1 wherein said magnetic field generating means comprises a permanent magnet positioned inside said block of scintillating plastic.

4. A particle monitor comprising: a hollow block of scintillating plastic having a projecting edge portion extending beyond and overhanging a portion of the surface thereof, said block having an opening extending through said surface portion into the hollow in said block to admit charged particles; a photomultiplier situated to cooperate with said hollow block, an electromagnet positioned outside said hollow block to constrain charged particles entering the block by way of said opening and having a preselected mass-energy product to traverse a predetermined arcuate path through said opening and within the hollow of said block; and particle detection means positioned on an inner surface of said hollow block to intercept particles including particles, traversing said path and to produce first signals in response to the intercepted particles; said hollow block being adapted to produce second signals in response to charged particles incident thereon thereby to identify charged particles traversing other than said predetermined path to become incident upon said particle detection means.

References Cited by the Examiner
UNITED STATES PATENTS

| | | | |
|---|---|---|---|
| 2,341,551 | 2/1944 | Hoover | 250—41.9 |
| 2,470,745 | 5/1949 | Schlesman | 250—41.9 |
| 2,601,097 | 6/1952 | Crawford | 250—41.9 |
| 2,734,949 | 2/1956 | Berry | 250—41.9 |
| 2,830,188 | 4/1958 | Scherbatskoy | 250—71.5 |

RALPH G. NILSON, *Primary Examiner.*
A. L. BIRCH, *Assistant Examiner.*